March 12, 1946.  G. J. HARTNETT, JR., ET AL  2,396,370
MACHINE TOOL
Filed Jan. 14, 1943   3 Sheets-Sheet 2
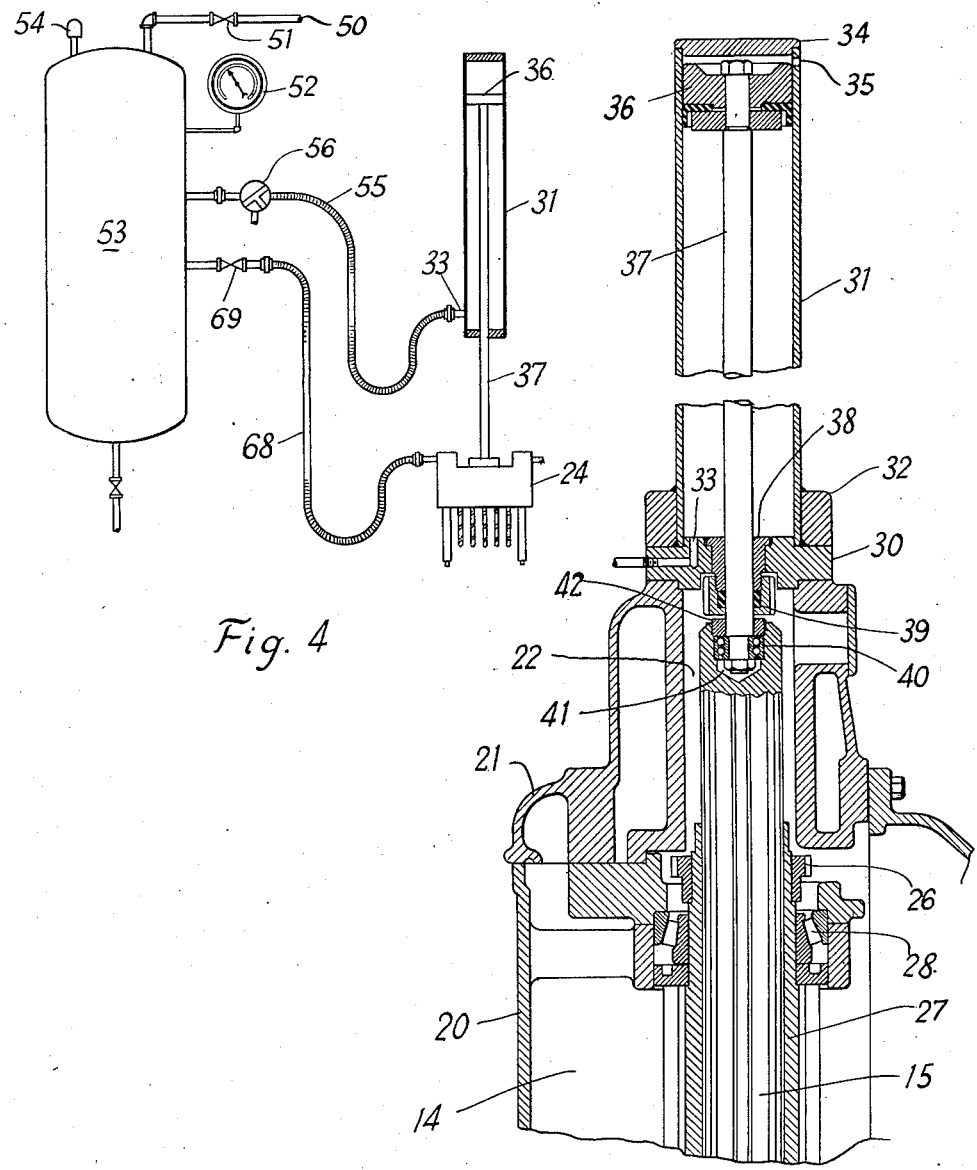
Fig. 4
Fig. 2
INVENTORS
George J. Hartnett, Jr.
Crawford Ziegler
BY
ATTORNEY Patented Mar. 12, 1946

2,396,370

UNITED STATES PATENT OFFICE 2,396,370

MACHINE TOOL

George J. Hartnett, Jr., Akron, and Crawford Ziegler, Barberton, Ohio, assignors to The Babcock & Wilcox Company, Rockleigh, N. J., a corporation of New Jersey Application January 14, 1943, Serial No. 472,326

6 Claims. (Cl. 77—36)

This invention relates in general to machine tools, and more particularly, to drilling machines having a rotary spindle movable vertically relative to its drive mechanism for the purpose of feeding one or more drills into and out of the work.

The weight of the spindle and the parts supported thereon would provide undesirable stresses on the spindle driving mechanism if carried thereby. For that reason a weight or a coiled spring is usually employed to counterbalance the spindle weight and load. A weight counterbalance however requires an unobstructed space adjacent the machine for its path of travel, adds substantially to the load on the machine frame, and is difficult to accurately adjust for desired changes in the amount of counterpull or lift on the spindle to compensate for changes in operating conditions. A spring counterbalance is usually preferred, provided it incorporates special provisions for effecting a uniform counterpull on the spindle throughout its range of movement and safety means for arresting the spindle on any breakage of the spring, as shown in U. S. Patent 1,577,975. While a coil spring having provisions for exerting a uniform counterpull on the spindle is satisfactory when the spindle carries only a relatively light load, such as a single drill or other tool, the counterbalancing problem becomes much more difficult when the spindle carries a heavy load, such as a multiple drill head which may weigh over 500 lbs.

In a single spindle multiple drill machine, it is desirable that the multiple drill head be revolvable through 360° to obtain the proper location of the drills relative to the work with a minimum movement of the work and be held in the desired angular position without exerting a lateral thrust on the drills while in the work. The usual provisions for this purpose comprise means for clamping the drill head in its adjusted position to a bracket on the tool head, an arrangement which obstructs adjustment and replacement of the drill head.

The general object of our invention is the provision of a machine tool of the character described in which the weight of the spindle and associated parts is counterbalanced by means which exert a substantially uniform counterpull on the spindle in all of its normal operating positions and can be readily adjusted to exactly counterbalance a wide range of loads on the spindle. A more specific object is the provision of counterbalancing means of the character described which are movable with but do not obstruct the movement of the spindle and associated parts, add little to the load on the tool head support, and include only a few movable parts of durable material and construction. A further object is the provision of improved means for holding an angularly adjustable drill head in its desired position relative to the work, while preventing any lateral thrust on the drills while in the work.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 2 is an enlarged sectional elevation of the spindle and counterbalance shown in Fig. 1;

Fig. 4 is a schematic diagram of the air supply system to the counterbalancing system.

Figure 1:
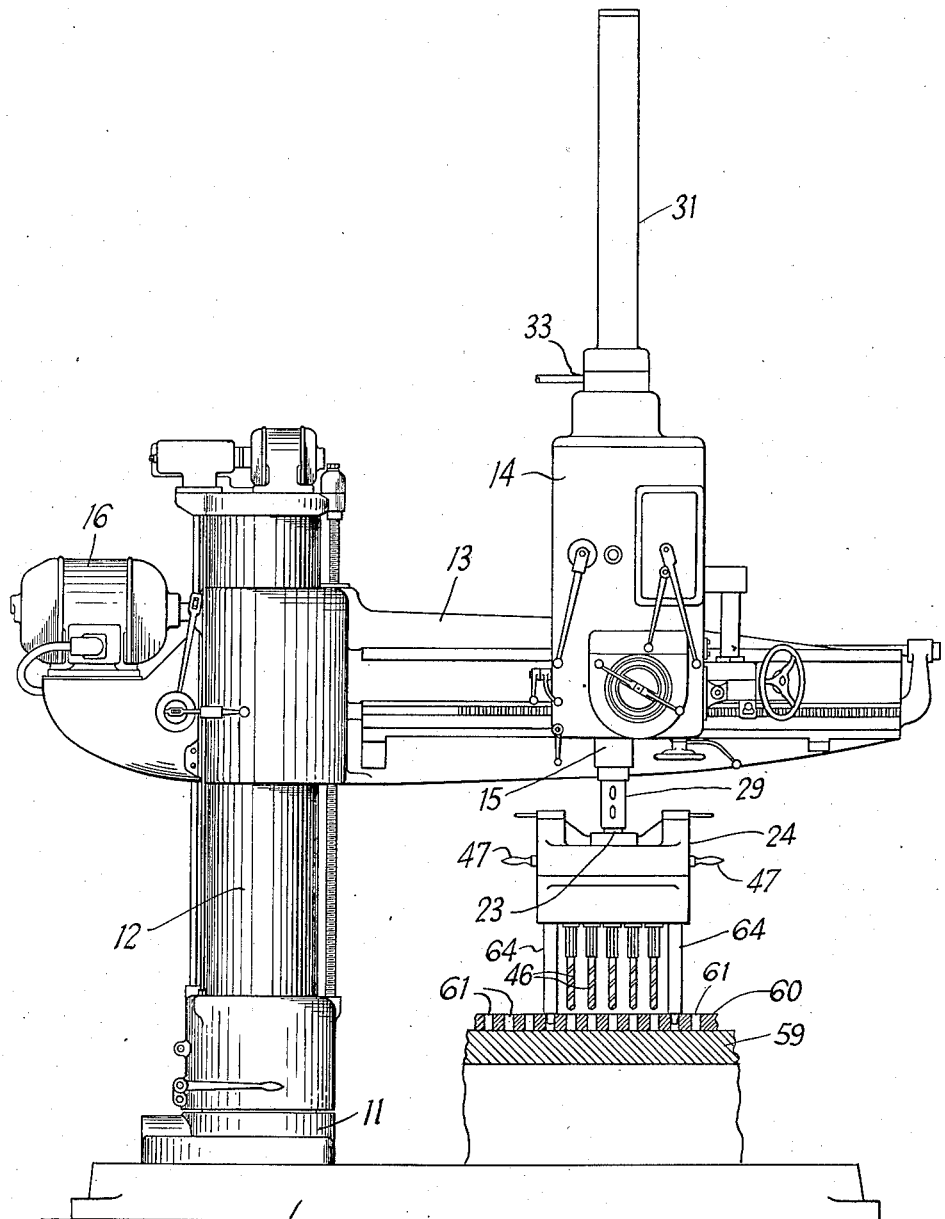
Fig. 1 is an elevation of a radial drill embodying the invention.

The radial drill illustrated in the drawings comprises a base member 10 on which the work piece is supported, a vertical column 11, a sleeve member 12 rotatable on the column, a horizontal arm 13 vertically adjustable on the sleeve member 12, and a main tool head 14 movable radially along horizontal guideways on the arm 13. The tool head encloses a rotatable and vertically movable tool spindle 15, which is adapted to be driven by an electric motor 16 through suitable speed change gearing at various rates of speed and feed. In operation the arm 13 is moved vertically and angularly about the column 11 to a desired position above the work piece and the head 14 is then moved along the arm and clamped in its proper working position. Machine tools of this type are well known and disclosed, for example, in U. S. Patent 2,092,336.

As shown in Fig. 2, the tool head 14 has a housing 20 including an upper cover 21 with a vertical passage 22 extending the height of the tool head. The vertical spindle 15 is positioned in the passage 22 and rotated by a drive gear 26 carried on a spindle sleeve 27 which in turn fits into and engages vertical slots in the spindle, permitting vertical movement of the spindle relative to the sleeve. The sleeve 27 is mounted in a roller bearing 28 adjacent its upper end. The lower end of the spindle is formed with a quill 29 into which the tapered upper end of a drive shaft 23 of a multiple drill unit 24 or other tool is detachably secured by a transverse key 25.

In accordance with our invention, the spindle is provided with an improved counterbalancing mechanism for the weight of the spindle and the parts carried thereby. As shown in Fig. 2, the top of the housing cover 21 is formed by a cylinder support plate 30 on which is mounted a vertically elongated cylinder 31 through a collar 32. A small L-shaped passage 33 is formed in the plate 30 to provide a fluid pressure inlet to the cylinder 31. The cylinder top is closed by a plate 34 and a vent hole 35 located adjacent the top plate. A piston 36 is positioned in the cylinder 31 at the upper end of a piston rod 37. The rod 37 extends downwardly through a bushing 38 in the plate 30 and packing 39 for connection to the upper end of the spindle 15.

The piston rod connection to the spindle is constructed to permit the spindle to rotate freely without turning the piston rod. For this purpose a ball bearing 40 is mounted on the reduced lower end of the rod 37 and fitted into a cavity 41 in the top of the spindle. A bearing nut 42 closes the upper end of the cavity 41 and holds the piston rod and spindle in their assembled position.

Figure 3:
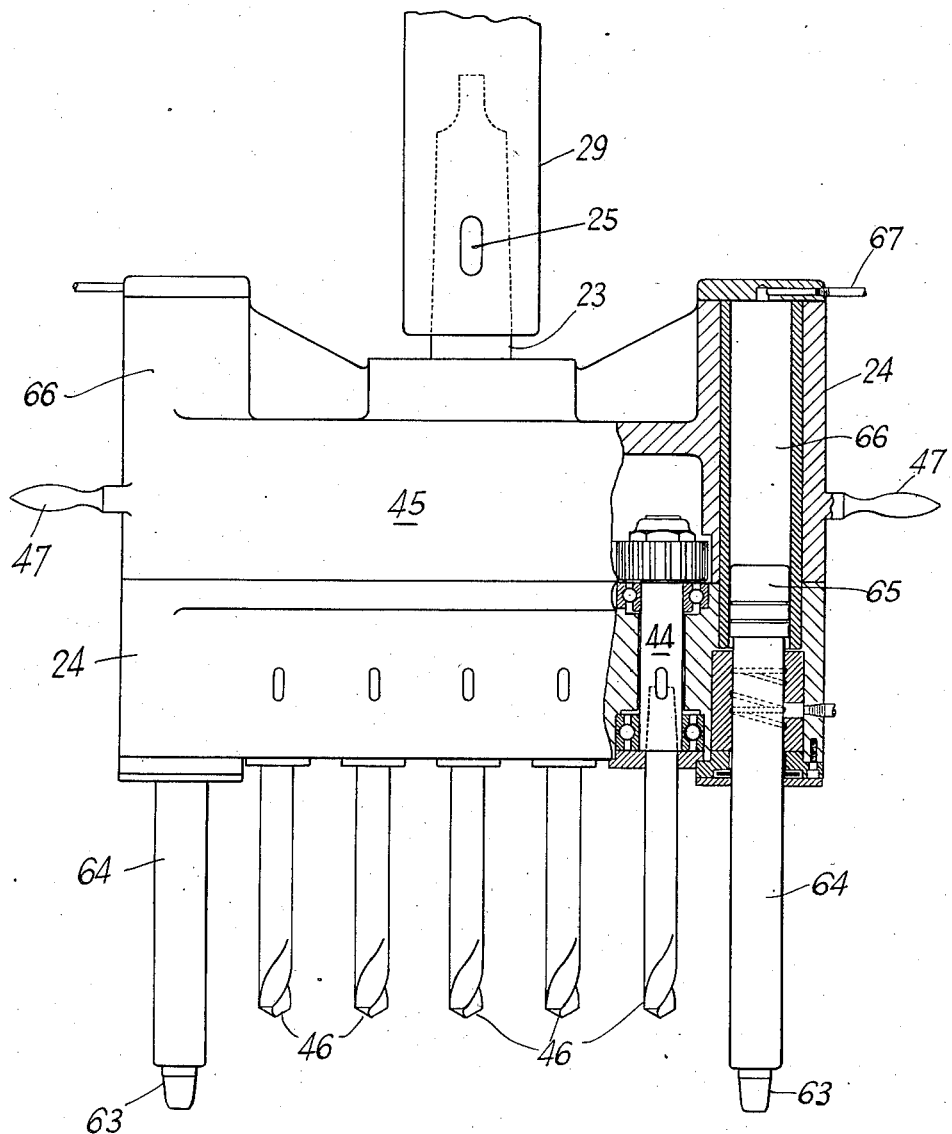
Fig. 3 is an enlarged elevation partly broken away and in section of the multiple drill head shown in Fig. 1.

As shown in Fig. 3, the multiple drill head 24 comprises a housing 45 of elliptical horizontal cross-section enclosing suitable gearing for driving a plurality of vertical spindles 44 into which rotary drills 46 are keyed, from the drive shaft 23. Five drills are indicated arranged in a single row along the major axis of the housing. Handles 47 on opposite sides of the head facilitate adjustment of the angular position of the head by the operator.

A compressed air system is diagrammatically indicated in Fig. 4 for supplying the fluid pressure to the underside of the piston 36. The air system comprises a supply line 50 from a suitable source of high pressure air. A regulating valve 51 and pressure gauge 52 are employed to regulate the compressed air supply to a receiver tank 53. A pressure relief valve 54 insures constant pressure conditions in the tank 53. An air line 55 in which a three-way valve 56 is incorporated leads to the air inlet 33 and cylinder 31.

In operation, the counterbalancing provisions described can be used either alone or to supplement the effect of a uniform tension coiled spring, set to counterbalance the weight of the spindle and a single drill or the spindle alone, such as is shown in U. S. Patent 1,577,975. In either case when a multiple drill head is used, the amount of the load to be counterbalanced by the piston is known and the regulating valve 51 is adjusted to secure the desired air pressure in the tank 53 and cylinder 31, the three-way valve 56 being normally open to permit an air flow through the line 55. The pressure relief valve 54 insures a constant uniform lift on the piston in all normal operating positions of the piston. Air can be withdrawn from below the piston by operation of the three-way valve 56 to permit a lower pressure in the piston cylinder, as is necessary on a change to a lighter drill head. Corresponding changes are also made in the position of the regulating valve 51 and pressure relief valve 56 for the lower pressure to be maintained. With the described construction the spindle can be easily and accurately counterbalanced for a wide range of loads thereon, thereby increasing the number and kind of machining operations for which the machine can be used, yet requiring only a minimum of adjustments by the operator.

When the drill is to be used for drilling rows of tube holes in a plate or drum 59, for example, the spindle is provided with a multiple drill head having its row of drills 46 spaced in accordance with the desired tube hole spacing. A bar 60 having holes 61 of the desired tube hole spacing is suitably secured to the drum to serve as a template for the drill. The tool head is moved to a position above the drum and the drill head swung into position above the bar 60 by means of the handles 47. The spindle is then rotated to lower the drills into the holes 61. This downward movement is guided by a pair of pilot pins 63 at the ends of the drill row and arranged to fit into holes 61 in the template 60. The pins 63 are tapered downwardly to facilitate their entrance and exit from the bar holes and provide any necessary final adjustment of the drill head. The pins 63 form the lower end portions of plungers 64 which also have pistons 65 on their upper ends. The pistons and plungers are positioned in air cylinders 66 at the ends of the drill head. An inlet 67 supplies a fluid under pressure to the upper side of the piston sufficient to hold the plungers in their extended position throughout the drilling operation. For this purpose the inlets 67 are connected to the receiver tank 53 through a pipe 68 having a regulating valve 69 therein set to a suitable pressure, which is usually lower than the air pressure on the piston 36. With this construction and mode of operation, the drill head will be firmly held in position during the drilling operation and any forces tending to create a lateral pressure on the drill head or individual drills are neutralized, thus preventing inaccurate drilling of the tube holes.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. A machine tool comprising a main tool head including a vertically movable rotary spindle, a tool carried by said spindle, means for driving and reciprocating said spindle and tool, and separate means for continuously exerting a substantially uniform fluid pressure counterbalancing effect on said spindle throughout the entire feed cycle of said spindle.

2. A machine tool comprising a main tool head including a vertically movable rotary spindle, a tool carried by said spindle, means for driving and reciprocating said spindle and tool, a piston chamber mounted on said main tool head, a piston in said chamber connected to said spindle, and separate means for continuously exerting a substantially uniform fluid pressure on said piston to counterbalance the weight load of said spindle throughout the entire feed cycle of said spindle.

3. A machine tool comprising a translatably mounted main tool head including a vertically movable rotary spindle, a tool carried by said spindle, means for driving and reciprocating said spindle and tool, a piston chamber mounted on said main tool head, a piston in said chamber connected to said spindle, and separate means for continuously exerting a substantially uniform fluid pressure on said piston to counterbalance the weight load of said spindle on said driving means throughout the entire feed cycle of said spindle.

4. A radial drilling machine comprising a rotatable and vertically adjustable horizontally arranged arm member, a main tool head translatably mounted on said arm member, a rotatable vertically movable tool spindle in said tool head, a multiple drill head mounted on the lower end of said spindle, means for driving and reciprocating said spindle and tool, and separate means for continuously effecting a substantially uniform counterbalancing fluid pressure on said spindle throughout the entire feed cycle of said spindle.

5. A radial drilling machine comprising a rotatable and vertically adjustable horizontally arranged arm member, a main tool head translatably mounted on said arm member, a rotatable vertically movable tool spindle in said tool head, a multiple drill head mounted on the lower end of said spindle, and means carried by said tool head for counterbalancing the weight load on said spindle throughout the entire feed cycle of said spindle including a piston chamber mounted on said tool head, a piston in said chamber having its lower end connected to the upper end of said spindle, and means for continuously effecting a substantially uniform counterbalancing fluid pressure on the underside of said piston.

6. A radial drilling machine comprising a rotatable and vertically adjustable horizontally arranged arm member, a main tool head translatably mounted on said arm member, a rotatable vertically movable tool spindle journalled in said tool head, a multiple drill head detachably mounted on the lower end of said spindle, and means carried by said tool head for counterbalancing the weight load on said spindle throughout the entire feed cycle of said spindle including a piston chamber mounted on said tool head, a piston in said chamber having a swivel connection with the upper end of said spindle, and means for continuously effecting a substantially uniform counterbalancing fluid pressure on the underside of said piston.

GEORGE J. HARTNETT, Jr.
CRAWFORD ZIEGLER.